(12) United States Patent
Esfahany et al.

(10) Patent No.: US 9,471,283 B2
(45) Date of Patent: Oct. 18, 2016

(54) GENERATING VIRTUALIZED APPLICATION PROGRAMMING INTERFACE (API) IMPLEMENTATION FROM NARRATIVE API DOCUMENTATION

(71) Applicant: CA, Inc., Islandia, NY (US)

(72) Inventors: Kouros Hodaee Esfahany, Setauket, NY (US); Jean-David Dahan, Cedar Park, TX (US); James Stephen Kress, Double Oak, TX (US); Debra J. Danielson, Skillman, NJ (US)

(73) Assignee: CA, Inc., New York, NY (US)

( * ) Notice: Subject to any disclaimer, the term of this patent is extended or adjusted under 35 U.S.C. 154(b) by 239 days.

(21) Appl. No.: 14/302,140

(22) Filed: Jun. 11, 2014

(65) Prior Publication Data

US 2015/0363171 A1    Dec. 17, 2015

(51) Int. Cl.
*G06F 9/44* (2006.01)

(52) U.S. Cl.
CPC ...................... *G06F 8/30* (2013.01)

(58) Field of Classification Search
CPC .......................................... G06F 9/44
USPC ................. 717/106, 107, 108, 123
See application file for complete search history.

(56) References Cited

U.S. PATENT DOCUMENTS

| | | | |
|---|---|---|---|
| 5,873,056 A | 2/1999 | Liddy et al. | |
| 7,027,974 B1 | 4/2006 | Busch et al. | |
| 7,568,019 B1 * | 7/2009 | Bhargava | G06Q 10/06 709/223 |
| 7,739,104 B2 | 6/2010 | Berkan et al. | |
| 7,765,097 B1 | 7/2010 | Yu et al. | |
| 8,261,295 B1 * | 9/2012 | Risbood | G06F 8/61 717/177 |
| 8,442,814 B2 | 5/2013 | Ceusters et al. | |
| 2002/0087548 A1 * | 7/2002 | Tasalloti | G06F 17/30887 |
| 2003/0023628 A1 * | 1/2003 | Girardot | G06F 9/547 715/202 |
| 2004/0148612 A1 * | 7/2004 | Olsen | G06F 8/30 719/328 |
| 2006/0069658 A1 * | 3/2006 | Haller | G06Q 10/10 705/78 |
| 2006/0190923 A1 * | 8/2006 | Jubran | G06F 8/20 717/104 |
| 2007/0005621 A1 * | 1/2007 | Lesh | G06F 19/3487 |
| 2007/0156622 A1 * | 7/2007 | Akkiraju | G06N 5/02 706/48 |
| 2008/0184211 A1 * | 7/2008 | Nickolls | G06F 8/456 717/140 |
| 2009/0089126 A1 * | 4/2009 | Odubiyi | G06F 17/271 705/7.39 |
| 2011/0072424 A1 * | 3/2011 | Choi | G06F 8/61 717/174 |
| 2012/0079221 A1 * | 3/2012 | Sivasubramanian | G06F 11/1456 711/162 |
| 2014/0136184 A1 * | 5/2014 | Hatsek | G06F 17/278 704/9 |

OTHER PUBLICATIONS

Profous ("Edge Cases of Updates in RESTful JSON APIs"), Aug. 22, 2013.*
CA, Inc., Data Sheet—"CA LISA® Service Virtualization", copyright 2013 CA, 2 pp.

(Continued)

*Primary Examiner* — Chat Do
*Assistant Examiner* — Jae Jeon
(74) *Attorney, Agent, or Firm* — Myers Bigel & Sibley, P.A.

(57) ABSTRACT

A virtualized Application Program Interface (API) implementation is generated based upon narrative API documentation that includes sentences that describe the API, by generating programming statements for the virtualized API implementation based upon parsing the narrative API documentation, and generating the virtualized API implementation based on upon the programming statements for the virtualized API implementation. The parsing of the narrative documentation may use a natural language parser and a domain-specific ontology for the API that may be obtained or created for the API. The virtualized API implementation may be generated using an API virtualizer.

12 Claims, 5 Drawing Sheets

(56) References Cited

OTHER PUBLICATIONS

CA, Inc., Data Sheet—"CA LISA® Pathfinder", copyright 2013 CA, 2 pp.

Michelsen, White Paper—"eliminate software development and testing constraints with service virtualization", copyright 2013 CA, 11 pp.

The Mind Project, "Introduction to Natural Language Processing", downloaded Apr. 28, 2014 from http://www.mind.ilstu.edu/curriculum/protothinker/natural_language_processing.php, 24 pp.

Wikipedia, the free encyclopedia, "Natural language processing", downloaded Apr. 21, 2014 from http://en.wikipedia.org/w/index.php?title=Natural_language_processing&printable=yes, 10 pp.

* cited by examiner

GENERATING VIRTUALIZED APPLICATION PROGRAMMING INTERFACE (API) IMPLEMENTATION FROM NARRATIVE API DOCUMENTATION

BACKGROUND

Various embodiments described herein relate to computer systems, methods and program products and, more particularly, to virtualization of computer systems, methods and program products.

In computer technology, services are unassociated, loosely coupled units of functionality that are self-contained. Composite applications are software programs that are constructed leveraging capabilities provided by services. Services expose Application Programming Interfaces (APIs), which define the interaction between a service and a consuming composite application (the "application"). The API may be related to a software library where the API describes the expected behavior while the library is an actual implementation of this set of rules. The API can also be related to a software framework that can be based on several libraries implementing several APIs, but unlike the normal use of an API, the access to the behavior built into the framework is mediated by extending its content with new classes plugged into the framework itself. The API may also include other types of interface protocol specifications. The capability exposed by the service via the API can be referred to as the "API implementation" or simply as the "service".

In developing the application, it may be desirable to begin the testing and simulation of the application before all of the dependent services are fully developed and/or in situations where it may not be practical to test using certain components. In these environments, service virtualization, also referred to as "API virtualization" or simply as "virtualization", may be used to simulate an API implementation (service) and thereby create a virtualized API implementation. Testing and simulation can be performed on various parts of the application before all parts are fully developed. Service virtualization can emulate the behavior of dependent (e.g. third party, evolving and/or not implemented) services that are used to exercise the application for development or testing purposes.

BRIEF SUMMARY

Various embodiments described herein can generate a virtualized API implementation based upon narrative API documentation that comprises sentences that describe the API. Programming statements for the virtualized API implementation may be generated based on parsing the narrative API documentation. The virtualized API implementation may then be generated based upon the programming statements for the virtualized API implementation. A computer system, method or program product that generates the virtualized API implementation based on the programming statements and/or other data for the virtualized API implementation may be referred to herein as an "API virtualizer".

The programming statements for the virtualized API implementation may be generated by parsing the narrative API documentation using a domain-specific ontology for the API. The parsing may be performed using a natural language parser.

In some embodiments, the parsing is performed by syntactically analyzing the API documentation using the domain-specific ontology for the API and semantically analyzing the API documentation using the domain-specific ontology for the API. In other embodiments, the parsing is performed by identifying parameters of the API from the narrative API documentation and identifying normal and abnormal behaviors of the API from the narrative API documentation. The parameters of the API and the normal and abnormal behaviors of the API may be converted into the programming statements for the virtualized API implementation.

In some embodiments, the identification of parameters of the API from the narrative API documentation may comprise identifying a type of a parameter, identifying syntactical constraints on a parameter, identifying range constraints on a parameter, identifying invariants of a parameter, identifying transforms of a parameter, and identifying semantic inferences of a parameter. Moreover, the identification of normal and abnormal behaviors of the API may comprise identifying a normal transaction, identifying error situations and invalid transaction types, identifying edge cases and limits, and identifying error messages and responses.

In some embodiments, as part of generating the virtualized API implementation, a data model of the virtualized API implementation may be generated. Once the virtualized API implementation is generated based upon the narrative API documentation, the virtualized API implementation may be used to construct a simulation framework, to generate synthetic transactions, to generate error reports and/or for other purposes.

Various embodiments described herein may provide an apparatus that comprises processor circuitry and memory circuitry coupled to the processor circuitry and comprising computer readable program code that, when executed by the processor circuitry, causes the processor circuitry to perform operations comprising generating a virtualized API implementation based upon narrative API documentation that comprises sentences that describe the API according to various embodiments described herein. In other embodiments, methods of API virtualization comprise generating a virtualized API implementation based upon narrative API documentation that comprises sentences that describe the API according to various embodiments described herein, wherein the generating is performed by processor circuitry. In still other embodiments, a computer program product comprises a computer-readable storage medium having computer readable program code embodied in the medium that, when executed by processor circuitry of a computer system, causes the computer system to perform operations comprising generating a virtualized API implementation based upon narrative API documentation that comprises sentences that describe the API according to any of the embodiments described herein.

It is noted that aspects described with respect to one embodiment may be incorporated in different embodiments although not specifically described relative thereto. That is, all embodiments and/or features of any embodiments can be combined in any way and/or combination. Moreover, computer equipment, systems, methods, and/or computer program products according to embodiments will be or become apparent to one with skill in the art upon review of the following drawings and detailed description. It is intended that all such additional computer equipment, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

A service that is not yet fully developed can still be virtualized for simulation and/or testing using, for example, an API virtualizer, such as the CA LISA® Service Virtualization product suite, marketed by CA, Inc. ("CA"), the assignee of the present application that are not readily available in their entirety and/or for situations that are difficult to reproduce. The CA LISA product suite simulates constrained or unavailable systems and networks. The CA LISA solutions are designed to allow users to more effectively develop in parallel, require less infrastructure for software development, and find defects earlier in the application development process. Applications can be delivered to market faster, with lower costs for application development systems and environments, and with higher quality applications for end users. The CA LISA API virtualizer product suite is described in the Data Sheet entitled "*CA LISA® Service Virtualization*", copyright 2013 CA; in the Data Sheet entitled "*CA LISA® Pathfinder*", copyright 2013 CA; and in the White Paper by John Michelsen, entitled "*eliminate software development and testing constraints with service virtualization*", copyright 2013 CA, the disclosures of all of which are hereby incorporated herein by reference in their entirety is if set forth fully herein.

Unfortunately, however, in many application development scenarios, a working or preliminary implementation of an API may not yet exist. In fact, in many environments, a complete definition of an API may not yet exist. Yet, various embodiments described herein can use narrative API documentation, which may provide natural language (e.g., English) sentences that describe an API, and use a natural language parser and a domain-specific ontology to parse the narrative API documentation, and thereby obtain programming statements for the API. The programming statements can then be provided to an API virtualizer, to create a virtualized API implementation. Thus, a virtualized API implementation may be generated according to various embodiments described herein, based upon narrative API documentation that includes sentences that describe the API. The virtualized API implementation that is generated may not be complete or functional, yet may still provide a reasonable facsimile that can be used as a preliminary basis for simulation, synthetic transaction generation, development and/or testing, while development of both the underlying service and the component application can proceed concurrently.

Figure 1:
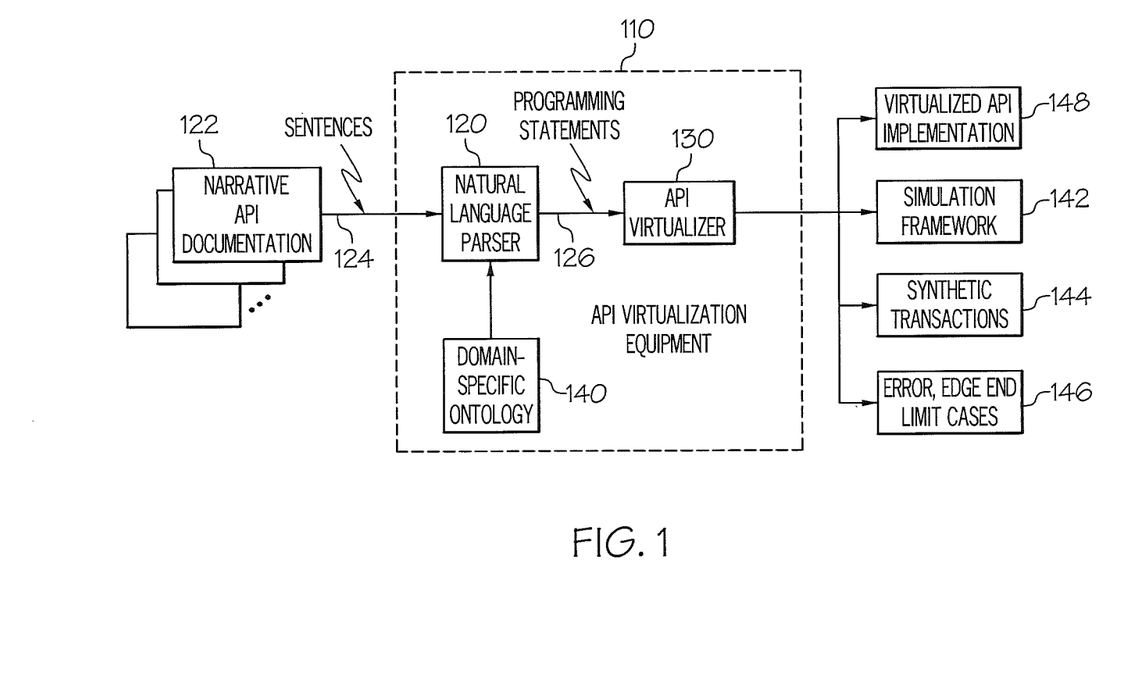
FIG. 1 is a block diagram of a computer system that includes API virtualization equipment according to various embodiments described herein.

FIG. 1 is a block diagram of a computer system that includes API virtualization equipment according to various embodiments described herein. This computer system may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable media.

Referring now to FIG. 1, the API virtualization equipment 110 generates a virtualized API implementation 148 based on narrative API documentation 122 that includes sentences 124 that describe the API. The narrative API documentation 122 may also be referred to as "human readable" API documentation. This documentation can provide a behavioral description of an API using a natural language, and may be in the form of a Microsoft® Word document, .pdf file, .html text, man and/or other formats. This documentation may be in electronic form, and/or may be scanned from print and converted to electronic form using, for example, Optical Character Recognition (OCR) and/or other techniques. The narrative API documentation 122 may provide a high level description of the API in terms of its behavior, in a manner that is intended for human consumption, rather than consumption by technology. The narrative API documentation 122 generally does not define all possible inputs to the API and the outputs that are produced therefrom. Rather, the narrative API documentation can provide a natural language specification of at least some of the API's behavior. It will be understood that a given API may have multiple sets of API documentation that may describe various aspects of the API's behavior, so that multiple narrative API documentation may be used, as illustrated in FIG. 1. In some embodiments, an interface may be provided to select a human-readable API document or documents, for example using a browse mechanism and/or other similar selection/collection mechanism.

Still referring to FIG. 1, the narrative API documentation 122 is provided to a natural language parser 120 that can analyze the narrative API documentation based upon a domain-specific ontology 140 that may be preexisting and/or may be created using domain experts for the API. More than one relevant domain-specific ontology also may be present, and any one or more of these ontologies may be used by the natural language parser 120. As used herein a "parser" means interpretive equipment, that may be embodied in software running on a processor, that maps natural language sentences to their syntactic structure or representation (as a result of syntactic analysis), and their logical form (as a result of semantic analysis). The parser uses the rules of grammar and rule meanings in a lexicon, also referred to herein as a "domain-specific ontology" 140. The domain-specific ontology 140 provides a dictionary and rules of grammar for the domain of the API. The domain-specific ontology 140 can frame parameter definitions, expected behaviors, error conditions, edge conditions and/or use cases, for example. Applying the ontology 140 to the natural language parser 120, programming statements 126 for the API may be identified that are intended for technological consumption by a computer system. The programming statements 126 may include one or more of the following:

parameters and parameter types;

normal transaction definition, for example by identifying sample code and/or through interpreting human-readable prose;

error situations and invalid transaction types;

edge cases, limits, and exceptions;

error messages, responses, and reactions;

syntactical constraints on untyped data, for example a certain payload must be XML validated by a predefined schema, or be a gzip stream of a java object input stream, predefined delimiters must be found at certain positions etc. . . . typical information that is used in Virtual System Environment (VSE) data protocol handlers;

invariants, for example tokens found in the response(s) at certain locations can be inferred from the same tokens in request(s) at specified locations (also referred to as magic strings or date);

range or space constraints, for example a date must be supplied within two bounds or an integer must be >0 etc. . . . on pain of predefined behavior;

exceptions;

transforms, for example date in response is a delta of date found in request (also referred to as magic dates), token in response must be Data Encryption Standard (DES) encrypted value of a certain token in request, etc.; and/or semantic inferences based on the domain ontology, for example a price is >=0, a plane seat is of the form digit digit letter, etc.

It will be understood that the programming statements 126 may not be a complete definition for the API. However, the programming statements 126 may provide a preliminary data model for the virtualized API implementation. As such, it may provide a basis for generating the virtualized API implementation 148 using an API virtualizer 130, such as the above-described CA LISA product suite.

The API virtualizer 130 may construct the virtualized API implementation 148, as well as a simulation framework 142, which may be provided at the protocol level, from information gleaned from the virtualized API implementation 148 itself, for example, Java SOAP, etc. Synthetic transactions 144 may also be generated, for example by constructing a skeleton for normal transaction simulation and populating the skeleton with one or more examples. Error, edge and limit cases 146 may also be constructed.

It will be understood that FIG. 1 illustrates the programming statements 126 that are generated by the natural language parser 120 being input directly into an API virtualizer 130. However, depending upon the capabilities of the API virtualizer 130, one or more intermediate operations may be performed to produce acceptable input for the API virtualizer 130. For example, the programming statements 126 may be converted to a standard programming language that may be used by the API virtualizer 130. In one example, the programming statements 126 may be converted to Web Services Description Language (WSDL), which is an XML-based interface description language that is used for describing the functionality offered by a Web service to provide a machine-readable description of how the service can be called, what parameters it expects and/or what data structures it returns.

Figure 2:
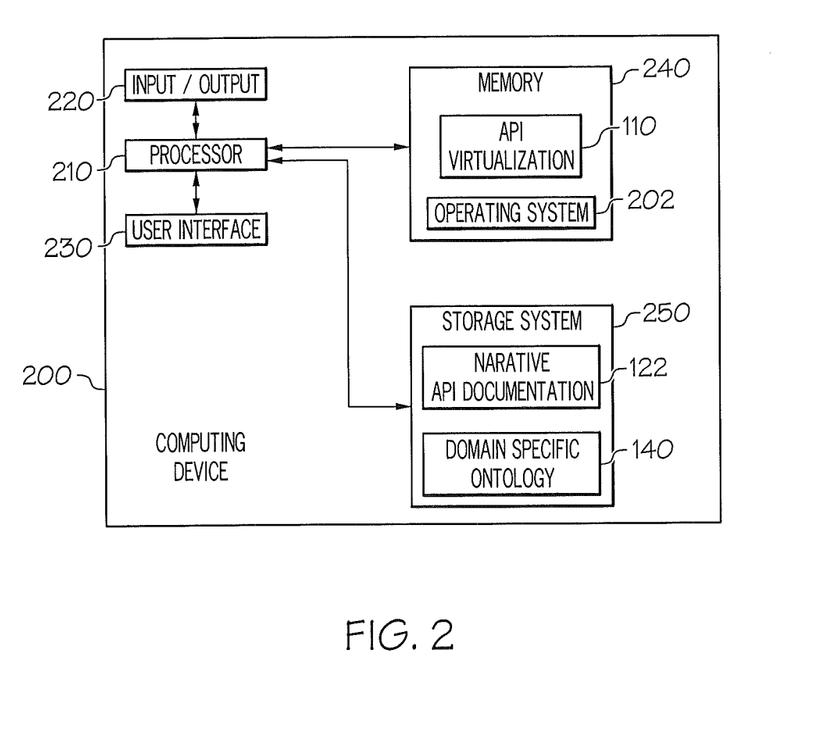
FIG. 2 is a block diagram of a computing device for API virtualization according to various embodiments described herein.

FIG. 2 is a block diagram of a computing device 200 that may be used to provide the API virtualization equipment 110 of FIG. 1, according to various embodiments described herein, using hardware, software implemented with hardware, firmware, tangible computer-readable storage media having instructions stored thereon and/or a combination thereof, and may be implemented in one or more computer systems or other processing systems. The computing device 200 may also be a virtual instance of a computer. As such, the devices and methods described herein may be embodied in any combination of hardware and software.

As shown in FIG. 2, the computing device 200 includes a user interface 230, such as a keyboard, keypad, display, pointing device, speaker, etc., that communicates with one or more processors 210 (generally referred to herein as "processor circuitry"). The processor 210 may include one or more data processing circuits, such as a general purpose and/or special purpose processor (e.g., microprocessor and/or digital signal processor), which may be collocated or distributed across one or more data networks. The processor 210 is configured to execute computer program instructions from the memory 240, described below as a computer readable medium, to perform some or all of the operations and methods for one or more of the embodiments disclosed herein.

The computing device 200 may also include an input/output interface 220 that may communicate with other communication devices and/or one or more networks, including any conventional, public and/or private, real and/or virtual, wired and/or wireless network, including the Internet. The input/output (I/O) data system 220 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

The computing device 200 may further include a memory 240 with an operating system 242 and API virtualization equipment 110 stored therein. The operating system 242 can manage operation of the computing service 200 and execution of the API virtualization 110. A storage system 250 may also be provided that includes a narrative API documentation 122 and a domain-specific ontology 140 stored therein.

The memory 240 and/or the storage system 250 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). Although illustrated in separate blocks, the memory 240 and the storage system 250 may be implemented by a same storage medium in some embodiments.

Figure 3:
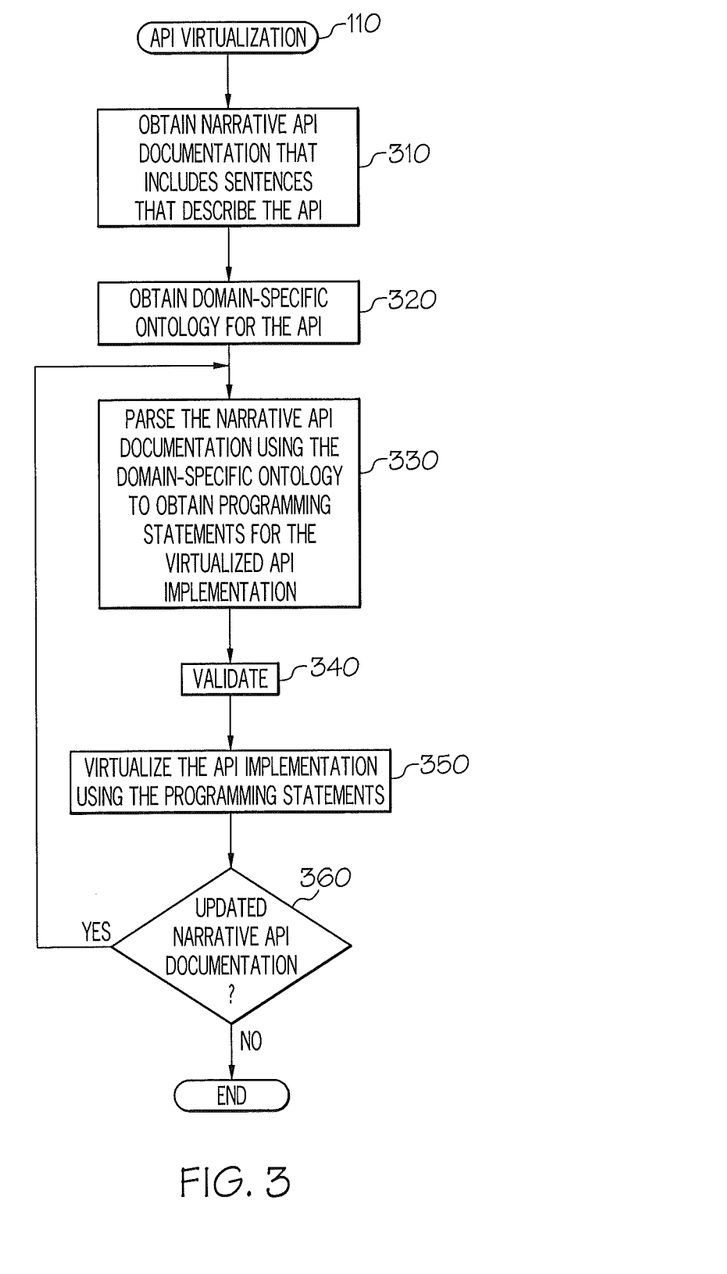
FIGS. 3-5 are flowcharts of operations that may be performed for API virtualization according to various embodiments described herein.

FIG. 3 is a flowchart of operations that may be performed to provide API virtualization, which may correspond to Block 110 of FIGS. 1 and/or 2. Referring to FIG. 3, at Block 310, narrative API documentation, such as the narrative API documentation 122 of FIGS. 1 and/or 2, that includes sentences that describe the API, is obtained, for example using a browsing mechanism or other similar selection/collection technique. In some embodiments, the narrative API documentation 122 may need to be reformatted for compatibility with a natural language parser 120 that is used.

At Block 320, a domain-specific ontology for the API, such as the ontology 140, is obtained and/or is created. The ontology 140 provides a collection of words or vocabulary that define behavior in a given domain. Stated differently, an ontology provides a set of descriptor words that relate to the field of the API. The ontology may be a preexisting ontology for a given domain of an API and/or may be created or supplemented using a domain expert, for example an author of the narrative API documentation 122.

Still referring to FIG. 3, at Block 330, the narrative API documentation 122 that was obtained at Block 310 is parsed using the domain-specific ontology 140 that was obtained at Block 320 to obtain programming statements for the virtualized API implementation 148. Parsing may take place using a natural language parser, such as the natural language parser 120, that can use semantic technologies to translate human-readable documentation into an underlying data model for the virtual service. As was noted above, the data model of the virtualized API implementation 148 may be generated directly at the parsing, or may be generated by further processing the programming statements 126. At Block 340, the programming statements may be validated using a software tool and/or domain/programming experts. Finally, at Block 350, the API implementation is virtualized using the programming statements that were created at Block 330, for example using an API virtualizer 130, such as the CA LISA product suite. The API virtualizer 130 can generate a virtualized API implementation 148 as well as a simulation framework 142, synthetic transactions 144 and/or error, edge and limit cases 146.

As was noted above, the narrative API documentation 122 may provide a reasonable facsimile of the API at the current state of development. However, as development progresses, the narrative API documentation 122 may be further refined. Accordingly, at Block 360, a determination is made as to whether an updated narrative API documentation is available and, if so, then the parsing of Block 330, the validating of Block 340 and the virtualizing of Block 350 may be performed again, so as to generate an updated virtualized API implementation based upon the updated narrative of the API documentation that behaviorally describes the API.

Figure 4:
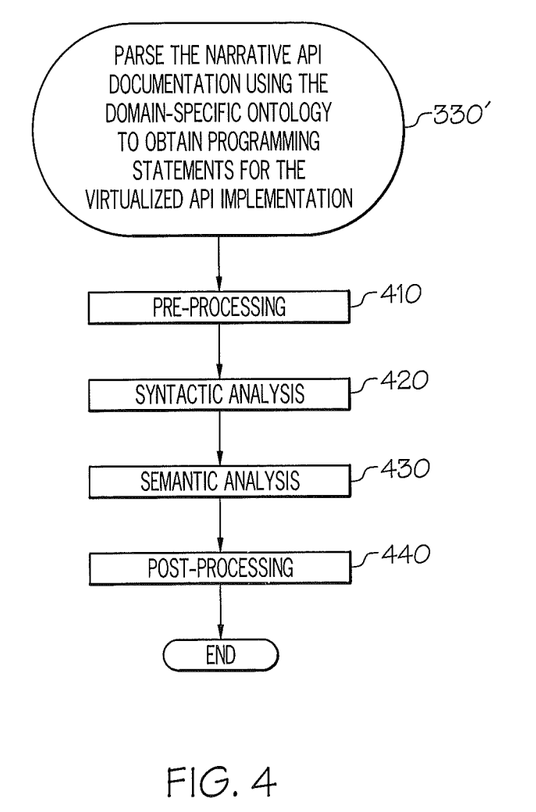

FIG. 4 is a flowchart of other operations 330' that may be performed to parse the narrative API documentation using the domain-specific ontology to obtain programming statements for the virtualized API implementation, according to various embodiments described herein. Referring to FIG. 4, a pre-processing operation may take place at Block 410 to, for example, convert the human-readable document into a format that is acceptable to the parser. For example, the human-readable documentation may be converted to ASCII characters. Pre-processing may also include identifying the sentences of the text for further processing.

Referring now to Block 420, syntactic analysis is performed on the API documentation using the domain-specific ontology for the API. As used herein, syntactic analysis includes determining the subject and predicate, and the placement of nouns, verbs, pronouns, etc., in a sentence. Given the variety of ways to construct sentences in a natural language, syntactic analysis may be more complicated than determining subjects, predicates, nouns, verbs, pronouns, etc., given the word order alone.

Referring now to Block 430, semantic analysis is performed. In some embodiments, once the operations have arrived at an analysis of the input sentence's syntactic structure, semantic analysis is performed to ascertain the meaning of the sentence. From the syntactic structure of a sentence that was obtained at Block 420, the operations of Block 430 attempt to produce a logical form of the sentence. The logical form may be context-free, in that it does not require that the sentence be interpreted in its overall context in which it occurs. Moreover, the logical form attempts to state the meaning of the sentence without reference to the particular natural language. Thus, semantic analysis attempts to approach the notion of a proposition from the original sentence. It will be understood that the operations of Blocks 420 and 430 may be performed differently from the order shown and, in some embodiments, syntactic analysis and semantic analysis may be intertwined.

Finally, referring to Block 440, post-processing is performed. Post-processing may be used to convert the output of Blocks 410-430 to a format that is usable by the particular API virtualizer 130 and/or virtualizing operation 340.

Figure 5:
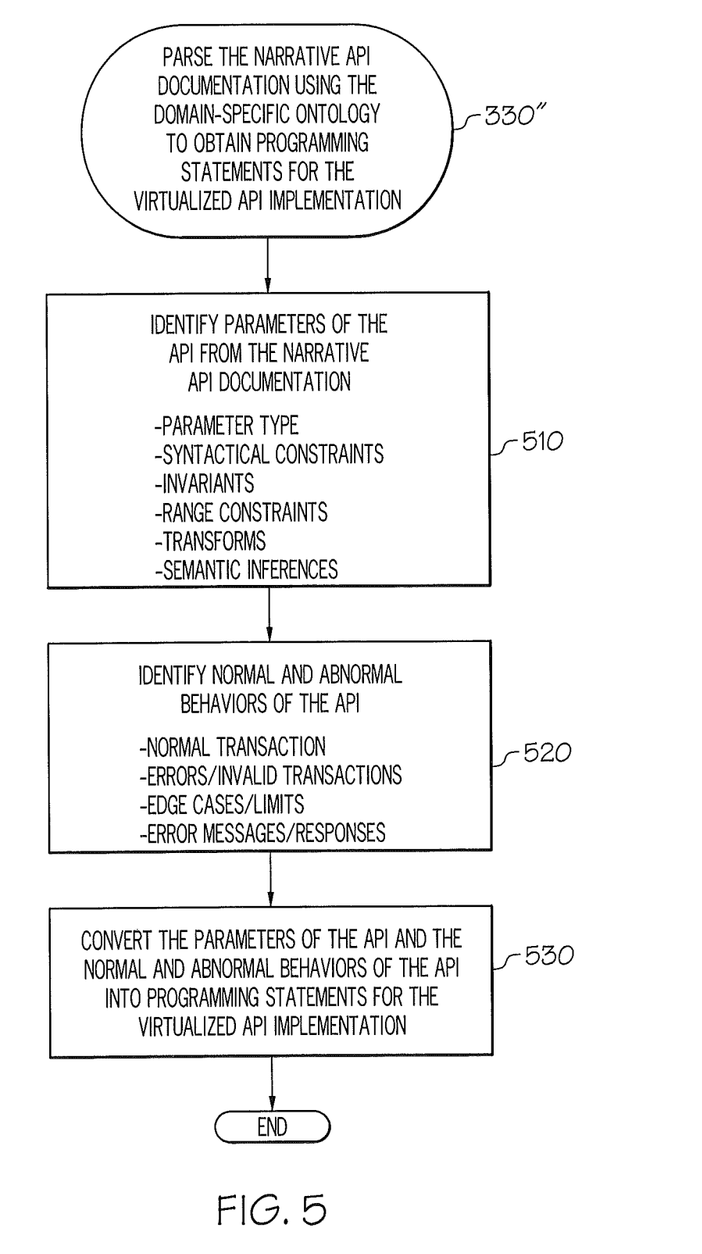

FIG. 5 is a flowchart of other operations 330" that may be used to parse the narrative API documentation using the domain-specific ontology to obtain programming statements for the virtualized API implementation, according to various embodiments described herein. Referring now to FIG. 5, at Block 510, parameters of the API are identified from the narrative API documentation. As also illustrated in Block 510, as part of identifying parameters, a parameter type for a given parameter may be identified. Moreover, syntactical constraints may also be identified. In some embodiments, syntactical constraints on un-typed data may be identified. For example, a certain payload may need to be XML-validated according to a given schema, or may be a gzip stream of a Java object input stream, wherein certain delimiters are found at certain positions. Moreover, invariants of a parameter may be identified. For example, a token of the parameter that will be returned in a response may be identified. Range constraints of parameters may also be identified. For example, a data must be supplied within two bounds, or an integer must be greater than 0. Transforms of a parameter may also be identified, wherein a response may not be identical to a token found in a parameter, but may be derived or transformed from a token in a parameter. Finally, semantic inferences may be obtained for a parameter. For example, if the parameter is a price, it must be greater than 0.

Still referring to FIG. 5, at Block 520, normal and abnormal behaviors of the API also may be identified. In some embodiments, a normal transaction definition may be identified, for example by identifying sample code or by interpreting human-readable prose. Error situations and invalid transaction types may also be identified. Edge cases, limits and exceptions may also be identified, wherein an edge case defines a boundary between a valid transaction and an invalid transaction. Stated differently, boundary conditions for a transaction may be identified. Finally, error messages and their responses and reactions may also be identified, to identify what may happen if a parameter is input in an incorrect manner.

Finally, at Block 530, the parameters of the API and the normal and abnormal behaviors of the API are converted into programming statements for the virtualized API implementation.

It will be understood that various natural language parsers, which may also be referred to as "natural language processors", may be used to perform the operations of Blocks 330, 330' and/or 330". Natural language parsers may generate link graphs from the sentences of the input documentation, and may use an ontology to create and/or interpret the graphs. Statistical analysis can be used in addition to, or instead of, creating the graphs. The natural language processor may also host a rules base that can be used to aid in the parsing and interpretation.

Additional discussion of various embodiments described herein will now be provided. Various embodiments described herein can automate the process of constructing virtual services and underlying synthetic transactions by interpreting human-readable API documentation. Information about the normal, edge and error behavior of the service may be described in the documentation, and may form the basis of a set of synthetic transactions.

More specifically, various embodiments described herein can generate a service virtualization, i.e., a virtualized API implementation that provides a reasonable facsimile, and in some embodiments a close approximation to, a real API, such that the virtualized API implementation may return similar outputs as the real API for a particular set of inputs. The real API may not yet exist, may be unavailable and/or may require access to other systems that are costly, unavailable and/or not yet developed. Yet, a virtualized API implementation can allow testing of the API and/or performing other desirable functions for the API while the original API is not yet available or still under development.

API virtualizers, such as the CA LISA product suite, may assume that a working version of an API already exists. The API may then be tested using tools, such as the CA LISA Pathfinder, to record live application traffic that is captured in pre-production. Thus, visibility may be obtained into how a particular piece of software is constructed and its dependencies with other software systems. Simulations may be built in two ways: a "man in the middle" between two software components, which can alter the client so that it vectors the recorder and captures the pass-through as it goes back and forth, and/or an "agent instrumentation" that can intercept everything including language method calls.

In enterprise business environments, many enterprises may have up to twenty or more different services to be virtualized. The services to be virtualized may be identified and specified by interviewing subject matter experts about the different services. Tools such as CA LISA Pathfinder may allow more power in discovering what can be virtualized, and to leverage heuristics to identify that which might be virtualized. However, virtualization may scale in multiple directions. First, individual enterprises may be looking to bring more services into virtualization more rapidly, and using fewer professional services to implement. Moreover, it may be desirable to construct a library of common virtualizations for use in a Software as a Service (SaaS) or service environment, so as to lower the threshold for enterprises to leverage personalization. It also may be desirable to increase efficiencies in onboarding and time to value for enterprises of all sizes and virtualizing. Finally, organizations may build applications in a more encapsulated, component, orchestrated fashion, which may exponentially increase the number of interfaces targeted for virtualization. Accordingly, the need for virtualization may continue to increase dramatically.

Conventionally, API virtualization may be performed through configuration or through "recording" of the activity of the API. This may require either the exercise of the application through many different cases including edge cases, which may be time consuming, or may be difficult to implement. Alternatively, a virtual configuration may be configured, at the potential expense of expensive coding or definition by developers/technicians.

In sharp contrast, various embodiments described herein can use narrative API documentation 122 that includes sentences 124 that can specify the behavior of an API to generate a virtualized API implementation 148. Semantic technologies may be used to translate human-readable API documentation 122, at the behavioral level, rather than at the programmatic level, into the underlying data model for the virtual service. API virtualizers 130 may then be used to construct synthetic transactions 144 based on the description in the documentation of the service. Error conditions and edges cases 146 may be constructed as well as normal operations. A summary report may also be constructed describing the progress the process has made on the construction and definition of the data model and synthetic transactions.

Accordingly, various embodiments described herein can virtualize an API from narrative API documentation that comprises sentences that describe the API, even though a programmatic API implementation is not available.

It will also be understood that various embodiments have been described herein in terms of generating a virtualized API implementation 148 based upon narrative API documentation 122 that comprises sentences 124 that describe the API. However, the converse may also be true. Specifically, an API may exist, but it may not have adequate documentation 122. However, if the actual API behavior can be observed, for example using the CA LISA product suite, documentation 122 may be generated from the API by generating programming statements 126 from the API, and then generating a behavioral description from the programming statements 126.

EXAMPLES

The following examples shall be regarded as merely illustrative and shall not be construed as limiting the invention.

Example 1 is an example of narrative API documentation 122 for an airline reservation system, such as may be provided commercially by the Expedia® or Travelocity® systems. Example 1 is written in Javadoc format. Example 1 provides a representative example of narrative API documentation 122. The Javadoc format may be easy to parse, because the @ symbol indicates that a parameter is being provided. Example 1 may have drawbacks, however, because the description of the parameters is much shorter than may be provided in a Word document written in narrative English. On the other hand, a Word document may be less structured, but give more description.

In Example 1, the sentences are numbered for purposes of subsequent explanation, but numbers are generally not included in the narrative API documentation.

Example 1

/**
(1)    * This secure method searches the backend for available plane tickets given
(2)    * @customerId a customer id as specified in
http://com/acme/Customer.html#getId (to apply targeted offerings or discounts for repeat customers or gold status customer), -continued

```
(3)     * @password a BASE 64 encoded 32 bit SHA1 encrypted password to ensure
only valid customers can perform the search
(4)     * @from a start date in the future
(5)     * @to a return date after the start date
(6)     * @flexible a boolean indicating if the customer is will to move to the from and to
dates plus or minus 3 days
(7)     * @originAirport a 3 character airport code available from
http://somesite.org/somelist
(8)     * @destinationAirport a 3 character airport code available from
http://somesite.org/somelist that is different from originAirport
(9)     * @options an object that encapsulates various search preferences, such as
including car rental, hotel booking, look only in economy, special meals, maximum
number of stops, search order. Look at http://com/acme/ISearchOptions.html for details.
(10)    * @return an array of possible plane tickets computed by the back end that satisfy
all the criteria supplied as arguments, sorted by @options sorting field, containing car and
hotel information if specified in the @options.
*/
(11)    public IPlaneFare[ ] searchAvailablePlaneTickets(String customerId, String
password, Date from, Date to, boolean flexible, String originAirport, String
destinationAirport, ISearchOption options).
```

In Example 1, sentence (1) indicates that a method definition is being specified, and that the words following "given" define parameters. For example, in sentence (2), a parameter "customerId" has a syntactic constraint defined, as specified in a URL. Similarly, in sentence (3), the parameter "password" has a syntactical constraint of being a BASE 64 encoded 32 bit SHA1 encrypted password. In sentence (4), the "start date" parameter includes a range constraint of being "date in the future", and in sentence (5), the "return date" has a range constraint of "after the start date". In sentence (6), the "flexible" parameter is of a parameter type "boolean" and in sentence (7), the parameter type for "originAirport" is a three-character airport code. The syntactical constraint in sentence (8) is similar to sentence (7), but a range constraint is also applied "that is different from originAirport". In sentence (9), the "options" parameter is a parameter type of "object". Sentence (10) defines a normal transaction that returns an "array of possible plane tickets". Finally, sentence (11) is the method call itself for the normal transaction.

Accordingly, Example 1 provides a typical example of narrative API documentation 122 for a method call. The narrative API documentation 122 of Example 1 may be applied to a natural language parser 120 using a domain-specific ontology 140 that relates to airline reservation systems. The ontology 140 may be preexisting and/or may be created. Programming statements 126, as illustrated in Example 2, may be created after traversing the object documentation and link graphs that are generated by the natural language parser 120.

Example 2

```
{Constraints:
{arg0: java.lang.String, length=32,
arg1: java.lang.String, BASE64=true, bits=32, SHA1,
arg2: java.util.Date, range: [Date.Now +/- (arg4 ? 3 : 0) , Date.Max],
arg3: java.util.Date, range: [arg2 + 1, Date.Max],
arg4: boolean
arg4: java.lang.String, range: ["ANC", "AUS", ...,"YCO"]
arg5: java.lang.String, range: ["ANC", "AUS", ..."YCO"] && ^arg4
arg6: com.acme.ISearchOptions
ret: com.acme.IPlaneFare[ ], sort: arg6.sorting, invariants:
{ret.orig = arg3,
ret.dest = arg5,
ret.start = arg2,
```

-continued

```
ret.end = arg3,
ret.price > 0,
ret.stops <= arg6.maxStops,
ret.class = arg6.class,
ret.carRental = null if arg6.carRental = false,
ret.hotelBooking = null if arg6.hotelBooking = false
etc...
}
```

In Example 2, the parameters are defined by the argument programming statements arg1-arg6, which may be obtained from sentences (1)-(9) of Example 1. The return programming statements "ret" may be obtained from the sentences (10) and (11) of Example 1. Example 2 may then be input to an API virtualizer 130, such as the CA LISA product suite, to generate a virtualized API implementation 148.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "circuitry," "module," "component," and/or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
generating a virtualized Application Programming Interface (API) implementation that simulates an API based upon narrative API documentation that comprises sentences that describe the API, wherein the generating is performed by processor circuitry,
wherein generating the virtualized API implementation based upon narrative API documentation that comprises sentences that describe the API comprises:
generating programming statements for the virtualized API implementation based upon parsing the narrative API documentation that comprises sentences that describe the API; and
generating the virtualized API implementation based upon the programming statements for the virtualized API implementation,
wherein generating programming statements for the virtualized API implementation based upon parsing the narrative API documentation that comprises sentences that describe the API comprises parsing the narrative API documentation using a domain-specific ontology for the API,
wherein parsing the narrative API documentation using the domain-specific ontology for the API comprises:
identifying parameters of the API from the narrative API documentation; and
identifying normal and abnormal behaviors of the API from the narrative API documentation,
wherein the identifying parameters of the API from the narrative API documentation comprises:
identifying a type of a parameter;
identifying syntactical constraints on a parameter;
identifying range constraints on a parameter;
identifying invariants of a parameter;
identifying transforms of a parameter; and
identifying semantic inferences of a parameter, and
wherein the method further comprises:
converting the parameters of the API and the normal and abnormal behaviors of the API into the programming statements for the virtualized API implementation.

2. The method of claim 1, wherein parsing the narrative API documentation using a domain-specific ontology for the API comprises:
syntactically analyzing the API documentation using the domain-specific ontology for the API; and
semantically analyzing the API documentation using the domain-specific ontology for the API.

3. The method of claim 1, wherein the identifying normal and abnormal behaviors of the API comprises:
identifying a normal transaction;
identifying error situations and invalid transaction types;
identifying edge cases and limits; and
identifying error messages and responses.

4. The method of claim 1, wherein generating the virtualized API implementation based upon the programming statements for the API comprises:
generating a data model of the virtualized API implementation.

5. The method of claim 1 further comprising:
constructing a simulation framework for the virtualized API implementation.

6. The method of claim 5 further comprising:
generating synthetic transactions for the virtualized API implementation.

7. The method of claim 5 further comprising:
generating error reports for the virtualized API implementation.

8. The method of claim 5, further comprising:
performing a simulation of the API using the simulation framework for the virtualized API implementation.

9. The method of claim 1, wherein generating the virtualized API implementation based on the programming statements for the virtualized API implementation is performed using an API virtualizer.

10. The method of claim 1 wherein parsing the narrative API documentation using a domain-specific ontology for the API comprises:
creating the domain-specific ontology for the API.

11. The method of claim 1, wherein parsing, by the natural language processor executing on the processor circuitry, the narrative API documentation comprises generating link graphs from the sentences of the narrative API documentation, and
wherein generating programming statements by the processor circuitry for the virtualized API implementation is further based upon the link graphs generated by the natural language parser.

12. An apparatus comprising:
processor circuitry; and
memory circuitry coupled to the processor circuitry and comprising computer readable program code that when executed by the processor circuitry causes the processor circuitry to perform operations comprising:
generating a virtualized Application Programming Interface (API) implementation that simulates an API based upon narrative API documentation that comprises sentences that describe the API,
wherein generating the virtualized API implementation that simulates the API based upon narrative API documentation that comprises sentences that describe the API comprises:
generating programming statements for the virtualized API implementation based upon parsing, by a natural language parser executing on the processor circuitry, the narrative API documentation that comprises sentences that describe the API; and
generating, by the processor circuitry, the virtualized API implementation based upon the programming statements for the virtualized API implementation,
wherein generating programming statements for the virtualized API implementation based upon parsing, by the natural language parser executing on the processor circuitry, the narrative API documentation that comprises sentences that describe the API comprises parsing the narrative API documentation using a domain-specific ontology for the API,
wherein parsing the narrative API documentation using the domain-specific ontology for the API comprises:
identifying parameters of the API from the narrative API documentation; and
identifying normal and abnormal behaviors of the API from the narrative API documentation,
wherein the identifying parameters of the API from the narrative API documentation comprises:
identifying a type of a parameter;
identifying syntactical constraints on a parameter;
identifying range constraints on a parameter;
identifying invariants of a parameter;
identifying transforms of a parameter; and
identifying semantic inferences of a parameter, and wherein the operations further comprise:
converting the parameters of the API and the normal and abnormal behaviors of the API into the programming statements for the virtualized API implementation.

\* \* \* \* \*